United States Patent
Abhishek et al.

(10) Patent No.: US 10,581,532 B2
(45) Date of Patent: Mar. 3, 2020

(54) SYSTEM AND A METHOD FOR ESTABLISHING DATA COMMUNICATION BETWEEN DEVICES USING AUDIO FREQUENCY

(71) Applicant: NAFFA INNOVATIONS PRIVATE LIMITED, Bangalore (IN)

(72) Inventors: Kumar Abhishek, Bangalore (IN); Ibrahim Sankadal, Belagavi (IN); Sidaray Biradar, Bangalore (IN)

(73) Assignee: NAFFA INNOVATIONS PRIVATE LIMTIED, Karnataka (IN)

( * ) Notice: Subject to any disclaimer, the term of this patent is extended or adjusted under 35 U.S.C. 154(b) by 0 days.

(21) Appl. No.: 16/042,465

(22) Filed: Jul. 23, 2018

(65) Prior Publication Data
US 2019/0028208 A1    Jan. 24, 2019

(51) Int. Cl.
*H04B 11/00* (2006.01)
*G10K 9/12* (2006.01)
*H04R 3/04* (2006.01)
*H04W 76/14* (2018.01)
*H04R 3/00* (2006.01)

(52) U.S. Cl.
CPC ............ *H04B 11/00* (2013.01); *G10K 9/12* (2013.01); *H04R 3/04* (2013.01); *H04W 76/14* (2018.02); *H04R 3/00* (2013.01); *H04R 2400/00* (2013.01)

(58) Field of Classification Search
CPC combination set(s) only.
See application file for complete search history.

(56) References Cited

U.S. PATENT DOCUMENTS

| | | | |
|---|---|---|---|
| 2003/0197782 A1* | 10/2003 | Ashe | G07G 1/14 348/150 |
| 2009/0067291 A1* | 3/2009 | Atsmon | A63H 3/28 367/118 |
| 2009/0096580 A1* | 4/2009 | Paananen | G06F 21/35 340/10.1 |
| 2009/0122787 A1* | 5/2009 | Huotari | H04L 63/0853 370/352 |

* cited by examiner

*Primary Examiner* — Nabil H Syed
*Assistant Examiner* — Cal J Eustaquio
(74) *Attorney, Agent, or Firm* — Barry Choobin; Patent 360 LLC

(57) ABSTRACT

The various embodiments of the present invention disclose a system and method for initiating communication between different devices using audio frequency. The invention enables buzzers to generate monotone or limited tones for communication and data transmission. The first electronic device includes a frequency generator, an audio driver library, the buzzer or speaker, and a transmitter & the second electronic includes has an audio receiver mic, audio driver library, frequency receiver. The transmitter generates a communication request from a first electronic device to second electronic device. Further, the first electronic device and the second electronic device is installed with a buzzer application which when executed on the processor, causes the processor to enable communication between the first electronic device and the second electronic device by generating audible frequency using the buzzer/speaker.

6 Claims, 2 Drawing Sheets

SYSTEM AND A METHOD FOR ESTABLISHING DATA COMMUNICATION BETWEEN DEVICES USING AUDIO FREQUENCY

CROSS-REFERENCE TO RELATED APPLICATIONS

The embodiments herein claim the priority of the Indian Provisional Patent Application No. 201741014150 filed on Apr. 21, 2017 and subsequently Post-dated by 3 months to Jul. 21, 2017 with the title "A SYSTEM AND A METHOD FOR ENABLING COMMUNICATION BETWEEN DEVICES USING AUDIO FREQUENCY", and the contents of which is included entirely as reference herein.

BACKGROUND

Technical Field

The present disclosure is related to a communication method. The present disclosure is particularly related to a method for enabling communication between two devices. The present invention is more particularly related to a method for enabling communication between a plurality of devices using audio frequency.

Description of Related Art

Users increasingly exchange data between a plurality of client devices. For example, a user with a smartphone and a tablet computer exchanges data between the smartphone and the tablet computer at times. As another example, a user replaces or upgrades a smartphone and migrates a data from a currently used smartphone to a replacement or new smartphone. Often, different client devices are connected to a network, thereby allowing the users to exchange data between the client devices via the network.

However, during exchange of data between client devices, in some instances, one of the client devices lacks information for establishing a connection with the network. For example, a client device lacks the network's service set identifier (SSID) and the type of available connections to the network. Conventionally, the SSID is manually provided to a client device or captured via a quick response (QR) code presented by another client device. While this allows the client device to establish a connection to the network to efficiently use the network's capabilities, the connection sometimes fails, thereby often necessitating the client device to establish an additional connection to the network after obtaining information regarding the network via the network connection. Additionally, when a network is not available or only limited-quality connections to network are available to the client device, data communication is inefficient between the client device and another client device.

However, exchanging security credentials over a wireless connection is susceptible to eavesdropping and compromises security when an eavesdropper successfully intercepts the security credentials without being noticed. Security precautions that prevent eavesdropping are advantageous to peer-to-peer communication users. Yet another possible communication mechanism produces sound waves and communicates through monotonic buzzers. However, generating monotonic buzzers is very difficult using current systems.

Hence, there exists a need for a system to establish/enable communication between a plurality of devices in the absence of a network connection. There is also a need for a system that enables buzzers to generate monotones or limited tones for communication and data transmission.

The abovementioned shortcomings, disadvantages and problems are addressed herein, which will be understood by reading and studying the following specification.

OBJECTIVES OF THE EMBODIMENTS

The primary object of the present invention is to provide a system and method for enabling communication between two devices.

Another object of the present invention is to provide a system and method to enable communication between two devices through audio frequency.

Yet another object of the present invention is to provide a system and method for providing communication in Electronic Data Capture (EDC) machines with a buzzer.

Yet another object of the present invention is to provide a system and method for enabling audio drivers in a device to interact with the hardware device such as a speaker/buzzer thereby generating buzzer frequency.

Yet another object of the present invention is to provide a system to enable buzzers to generate monotone or limited tones for communication and data transmission.

Yet another object of the present invention is to provide a system and method for file sharing between the two devices using frequency generation.

Yet another object of the present invention is to provide a system and method for enabling communication between different devices in the absence of network connection.

Yet another object of the present invention is to provide a system and method for unlimited data transfer between the two devices using frequency generation.

These and other objects and advantages of the present invention will become readily apparent from the following detailed description taken in conjunction with the accompanying drawings.

SUMMARY

The various embodiments of the present invention disclose a system and method for enabling/establishing communication between two devices without using network connection. The system and method enables communication between different devices by generating frequencies using a buzzer. The method involves enabling/establishing communication in EDC machines built-in with a buzzer. The method enables audio drivers in the device to interact with the hardware device such as a speaker/buzzer to generate buzzer frequency. According to an embodiment, the present invention provides file sharing between the two devices by generating frequency. The method provides unlimited data transfer between the two devices using frequency generation. Thus, the system and method enables communication between different devices in the absence of network connection.

According to one embodiment of the present invention, the system includes a first electronic device embedded with a frequency generator, an audio driver library, the buzzer or speaker, and a transmitter. The transmitter receives a communication request from a second electronic device.

According to one embodiment of the present invention, the first electronic device and the second electronic device are installed with a buzzer application which when executed on the processor, causes the processor to enable/establish communication between the first electronic device and the second electronic device by generating audible frequency using the buzzer/speaker. The buzzer application is developed by using any framework like .Net, Java, C, C++, Python etc., which are capable of interacting with the Audio driver library provided in a service provider system/server. The audio driver library includes algorithms that are executed by a processor to directly interact with the electronic device's audio drivers, with or without modification. The audio driver library is configured to generate a tone based on a digital data to be transmitted by the application software. The tone generated is unique based on speaker/buzzer frequency response. The tone is provided by the driver functions that are used to communicate with speaker/buzzer. Once a communication is established, the tone generated is decoded with the help of audio library installed in the second electronic device.

According to one embodiment of the present invention, a system is provided for enabling buzzers to generate monotone or limited tones for data communication and data transmission.

According to one embodiment of the present invention, the buzzer applications performs the following function including but not limited to transaction, data sharing, handshaking and alerting or notification. For the aforementioned functions, the audio driver library generates a predetermined tone in the first electronics device. The predetermined tone encodes the digital data provided by the buzzer application. The digital data is received at a second electronic device for decoding.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
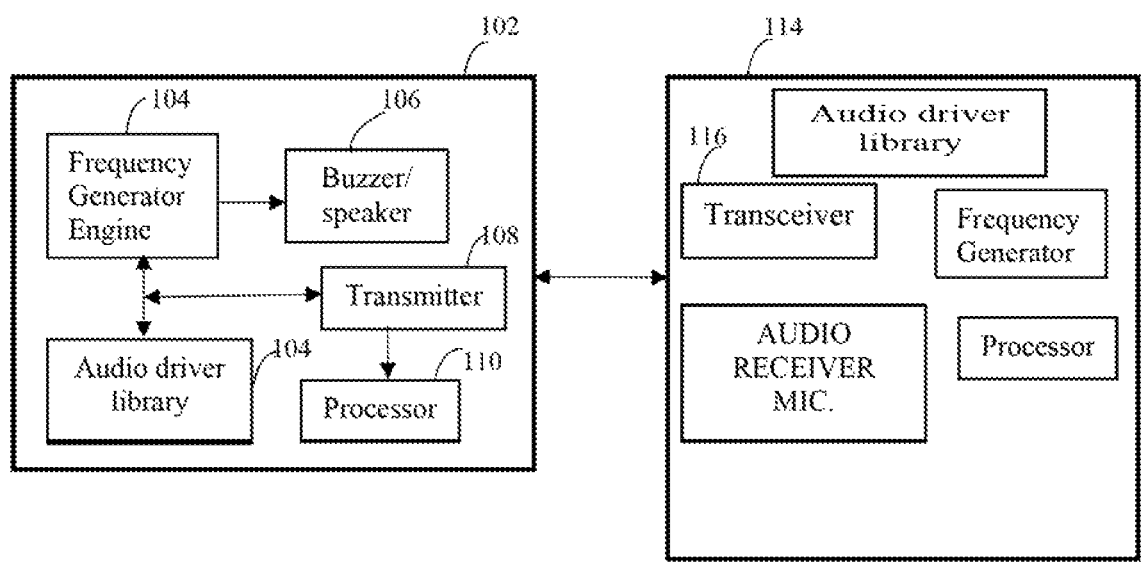
FIG. 1 illustrates a block diagram of a system for communication between devices by generating frequencies, according to one embodiment of the present invention.

Although the specific features of the present invention are shown in some drawings and not in others. This is done for convenience only as each feature may be combined with any or all of the other features in accordance with the present invention.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The various embodiments of the present invention disclose a system and method for enabling/establishing communication between two devices without using network connection. The system and method enables communication between different devices by generating frequencies using a buzzer. The method involves enabling/establishing communication in EDC machines built-in with a buzzer. The method enables audio drivers in the device to interact with the hardware device such as a speaker/buzzer to generate buzzer frequency. According to an embodiment, the present invention provides file sharing between the two devices by generating frequency. The method provides unlimited data transfer between the two devices using frequency generation. Thus, the system and method enables communication between different devices in the absence of network connection.

According to one embodiment of the present invention, the system includes a first electronic device embedded with a frequency generator, an audio driver library, the buzzer or speaker, and a transmitter. The transmitter receives a communication request from a second electronic device.

According to one embodiment of the present invention, the first electronic device and the second electronic device are installed with a buzzer application which when executed on the processor, causes the processor to enable/establish communication between the first electronic device and the second electronic device by generating audible frequency using the buzzer/speaker. The buzzer application is developed by using any framework like .Net, Java, C, C++, Python etc., which are capable of interacting with the Audio driver library provided in a service provider system/server. The audio driver library includes algorithms that are executed by a processor to directly interact with the electronic device's audio drivers, with or without modification. The audio driver library is configured to generate a tone based on a digital data to be transmitted by the application software. The tone generated is unique based on speaker/buzzer frequency response. The tone is provided by the driver functions that are used to communicate with speaker/buzzer. Once a communication is established, the tone generated is decoded with the help of audio library installed in the second electronic device.

According to one embodiment of the present invention, a system is provided for enabling buzzers to generate monotone or limited tones for data communication and data transmission.

According to one embodiment of the present invention, the buzzer applications performs the following function including but not limited to transaction, data sharing, handshaking and alerting or notification. For the aforementioned functions, the audio driver library generates a predetermined tone in the first electronics device. The predetermined tone encodes the digital data provided by the buzzer application. The digital data is received at a second electronic device for decoding.

FIG. 1 illustrates a block diagram of a system enabling communication between different devices, according to one embodiment of the present invention. The present invention enables frequency generation in an electronic device embedded with a speaker or a buzzer.

According to one embodiment of the present invention, the system includes a first electronic device 102 embedded with a frequency generator 104, an audio driver library 106, the buzzer or speaker 108, and a transmitter. The transmitter receives a communication request from a second electronic device 12.

According to one embodiment of the present invention, the first electronic device 102 and the second electronic device 112 are installed with a buzzer application which when executed on the processor 110, causes the processor to enable communication between the first electronic device 102 and the second electronic device 112 by generating audible frequency using the buzzer/speaker. The buzzer application is developed by using any framework like .Net, Java, C, C++, Python etc. which are capable of interacting with the Audio driver library 106 (Tonetag library).

The audio driver library 106 includes algorithms which when executed by a processor 110, directly interact with the electronic device's audio drivers, with or without modification. The audio driver library 106 is configured to generate tone based on digital data passed by the application software. The tone generated is unique based on speaker/buzzer frequency response. The tone is provided by the driver functions that are used to communicate with speaker/buzzer. Once a communication is established, the tone generated is decoded with the help of audio library (Tonetag library) installed in the second electronic device.

According to one embodiment of the present invention, the buzzer applications performs the following function including but not limited to transaction, data sharing, handshaking and alerting or notification. For the aforementioned functions, the audio driver library generates a predetermined tone in the first electronics device. The predetermined tone encodes the digital data provided by the buzzer application. The digital data is received at a second electronic device for decoding.

According to one embodiment of the present invention, an electronic device initiates communication with a EDC device. The EDC device includes a buzzer and is further installed with the buzzer application. The EDC generates a digital message including a transaction ID, merchant information, and amount information. The EDC generates a set of frequencies corresponding to the digital message. The EDC further generates a tone in response to the request from the electronic device. The buzzer application in the EDC selects the frequency to be generated from the audio library based on the header associated with the electronic device. The buzzer in the EDC generates sound transmitting the digital message to the electronic device. The digital message is received by a transceiver in the electronic device. The electronic device decodes the digital message to retrieve information regarding a transaction. In an embodiment, the electronic device enables a user to enter PIN code or security code of the transaction on the electronic device. The PIN code or security code is further transmitted to a payment server to complete the transaction. Thus, the method disclosed in the present invention provides secure and reliable communications and transactions by generating frequencies.

According to one embodiment of the present invention, the method of communication between two devices by frequency generation through a buzzer/speaker is utilized for sharing files. The first electronic device and the second electronic device initiates a handshake by generating a predetermined frequency. The predetermined frequency is selected by the first electronic device from the audio library based on the header associated with the second electronic device. Once the second electronic device reads the generated frequency, a handshake connection is established between the two devices. According to an embodiment of the present invention, there is no limit on volume of data transferred between the two devices using frequency generation.

Figure 2:
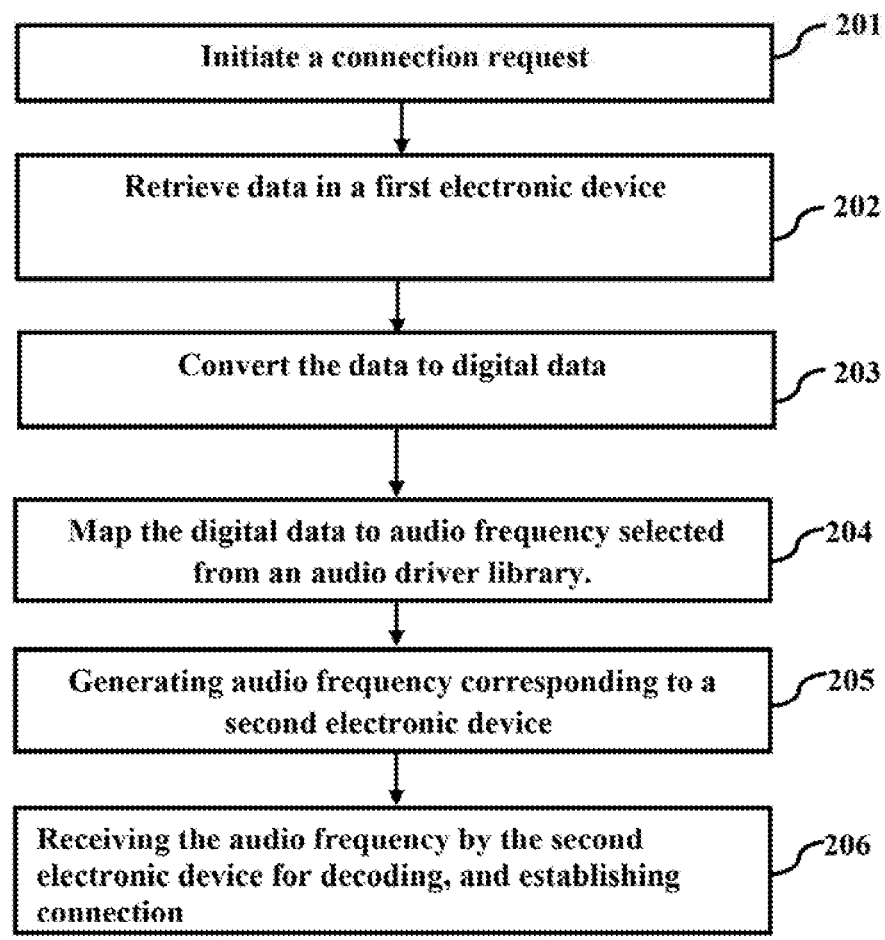
FIG. 2 is a flowchart illustrating a method of communication between devices by generating frequencies, according to one embodiment of the present invention.

FIG. 2 is flowchart illustrating a method of communication between different devices using frequency generation, according to one embodiment of the present invention. The method enables at least one of communication, handshakes, transactions, and file transfer between two different devices using voice frequency. The method enables audio drivers in a first device to interact with the hardware device such as a speaker/buzzer thereby generating buzzer frequency in a second device. According to one embodiment of the present invention, the first electronic device and the second electronic device is installed with a buzzer application that enables communication between the first electronic device and the second electronic device by generating audible frequency using the buzzer/speaker.

According to one embodiment of the present invention, the first communication device initiates a connection request (201). The first communication device retrieves data to be communicated (202). The retrieved data is converted to digital data (203). The digital data is mapped with the audio frequency selected from an audio driver library (204). Subsequently, an audio frequency corresponding to the second electronic device is generated (205). The audio frequency is received by the second electronic device and further decoded (206). Thus, a connection is established between the first electronic device and the second electronic device.

The various embodiments of the present invention disclose a system and method for enabling communication between two devices without using network connection. The system and method enables communication between different devices by generating frequencies using a buzzer. The system enables buzzers to generate monotone or limited tones for communication and data transmission. The method enables communication in EDC machines inbuilt with a buzzer. The method enables audio drivers in the device to interact with the hardware device such as a speaker/buzzer thereby generating buzzer frequency. The present invention provides file sharing between the two devices by generating frequency. The method provides unlimited data transfer between the two devices using frequency generation. Thus, the system and method enables communication between different devices in the absence of network connection.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for enabling/establishing communication between a plurality of devices through audio frequencies, the system comprising: a first electronic device, wherein the first electronic device comprises a frequency generator engine, an audio driver library module, a buzzer and/or a speaker module, a transmitter module and a processor module; a second electronic device, wherein the second electronic device comprises a transceiver module; and, a buzzer application module, wherein the buzzer application module is configured to run on the first electronic device and the second electronic device, and wherein the buzzer application module is run on a processor to generate tone for establishing data communication between the first electronic device and the second electronic device, and wherein the generated tone is a mono tone or predetermined tone;

wherein a digital data communicated between the first electronic device and the second electronic device comprises the information that contains alpha-numeric characters array, and wherein the information is a token, serial id, name, pin, OTP or other-authentication information, and wherein the alpha-numeric characters used are subset of the characters presented on the digital keyboard, and wherein, the digital data is arranged in a format represented by, where TID represents a terminal or device id, and wherein TXNID represents a timestamp based uniquely generated transaction id, and AMNT represents a transacted amount and wherein the EPC is configured to generate a tone in response to a request from the second electronic device, and wherein the buzzer application in the EPC selects the frequency to be generated from the audio driver library based on a header associated with the second electronic device, and wherein the buzzer in the EPC generates a sound signal for digital data is received by a transceiver in the second electronic device, sod wherein the second electronic device decodes the digital data to retrieve Information regarding a transaction, and where the second electronic device enables a user to enter PIN code or security code of the transaction on the electronic device, and wherein the PIN cede or security code is further transmitted to a payment server to complete the transaction; and wherein the first electronic device and the second electronic device are configured to be connected to each other through a peer-to-peer communication, without requiring an external network to connect the first electronic device and the second electronic device.

2. The system according to claim 1, wherein the buzzer application is configured to be executed on the processor, and wherein the execution of the buzzer application causes the processor to enable communication between the first electronic device and the second electronic device by generating an audible frequency using the buzzer and/or speaker, and wherein the buzzer application is developed by using any standard application development framework that, are capable of interacting with the audio driver library.

3. The system according to claim 1, wherein the audio driver library is configured to be directly executed by the processor and directly interact with an audio driver of the first electronic device with or without: modification, and wherein the audio driver library is configured to generate a tone based on the digital data to be transmitted by the buzzer application, and wherein the generated tone is unique based on the speaker and/or the buzzer frequency response, and wherein the generated tone is issued by the driver functions that are used to communicate with speaker and/or buzzer, and wherein, the generated tone is received and decoded by an audio driver library installed in the second electronic device.

4. The system according to claim 1, wherein the buzzer application is configured to generate a predetermined tone using the audio driver library in the first electronics device to perform e-commerce transactions, data sharing, handshaking and alerting or notification, and wherein the predetermined tone encodes the digital data provided by the buzzer application, and wherein the digital data is received at the second electronic device for decoding.

5. The system according to claim 1, wherein the EDC device comprises a buzzer and wherein the EPC device is further configured with the buzzer application, and wherein the EDC is configured to generates the digital data including a transaction ID, merchant information, and amount information, and wherein the EDC is configured to generate a set of frequencies corresponding to the digital data.

6. The system according to claim 1, wherein the first electronic device is configured to transmit the digital data to the second electronic device by generating audio frequency through the buzzer using the buzzer application and/or speaker for sharing digital files, and wherein first electronic device and the second electronic device are configured to initiate a handshake by generating a-predetermined frequency, and wherein tire predetermined frequency is selected by the first electronic device from the audio driver library based on the header associated with the second electronic device, and wherein the second electronic device is configured to receive and read the generated frequency after a handshake connection is established between the first electronic device and the second electronic device and uheiein the digital data is transferred between the first elections device and the second electronic device through frequency generation without any threshold limit on volume.

* * * * *